No. 760,569. PATENTED MAY 24, 1904.
J. W. SCANLAND.
NUT LOCK.
APPLICATION FILED NOV. 13, 1903.
NO MODEL.

Witnesses
G. Howard Walmsley,
Clarence S. Rice.

Inventor
John W. Scanland,
By H. A. Toulmin
Attorney

No. 760,569.

Patented May 24, 1904.

UNITED STATES PATENT OFFICE.

JOHN W. SCANLAND, OF SELMA, OHIO.

NUT-LOCK.

SPECIFICATION forming part of Letters Patent No. 760,569, dated May 24, 1904.

Application filed November 13, 1903. Serial No. 180,991. (No model.)

*To all whom it may concern:*

Be it known that I, JOHN W. SCANLAND, a citizen of the United States, residing at Selma, in the county of Clark and State of Ohio, have invented certain new and useful Improvements in Nut-Locks, of which the following is a specification, reference being had therein to the accompanying drawings.

This invention relates to nut-locks, and has for its object to provide a nut-lock of cheap, practicable, and effective character for the purpose of preventing the loosening of the nut on the bolt and for holding it in whatever position it may be placed.

To this end the invention consists in certain novel features hereinafter described and claimed.

The invention is illustrated in the accompanying drawings, in which—

Figure 1:
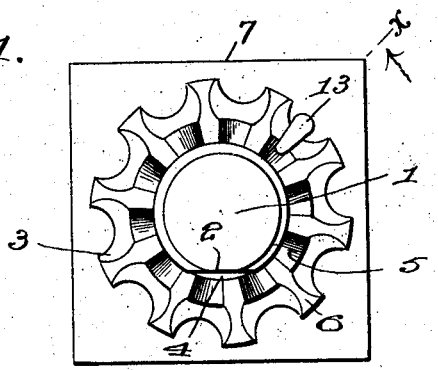
Figure 2:
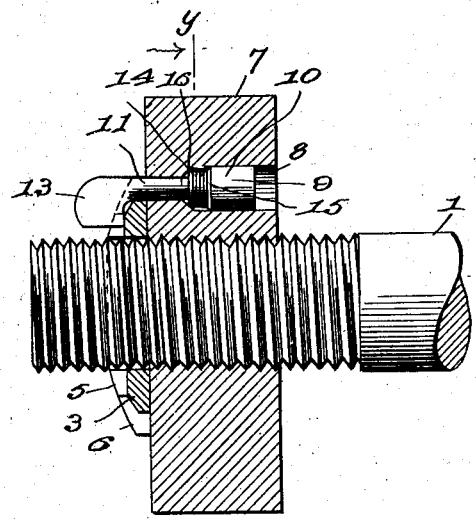
Figure 4:
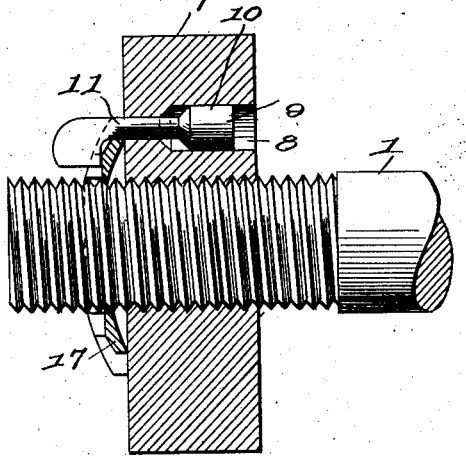
Figure 3:
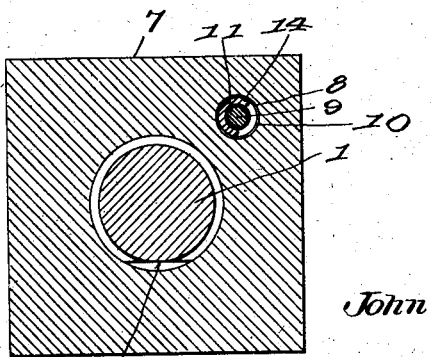

Figure 1 is an end elevation of a structure embodying my invention in one form. Fig. 2 is a sectional view taken on the line $x\,x$ of Fig. 1 and looking in the direction of the arrows. Fig. 3 is a sectional view taken on the line $y\,y$ of Fig. 2 and looking in the direction of the arrows; and Fig. 4 is a view similar to Fig. 2, illustrating a modification.

Referring first to Figs. 1, 2, and 3 of the drawings, 1 designates the bolt, which is flattened as to part of its circumference, as indicated at 2, or is otherwise non-circular in cross-section.

3 is a washer provided with an aperture 4, having the same shape in cross-section as the bolt 1, so as to prevent the washer from rotating about the bolt. The washer is made with radial grooves or recesses 5 in its outer face and with corresponding peripheral notches 6.

7 designates the nut, through which is formed an eccentric aperture 8, in which is placed a locking-pin 9. The aperture 8 is greater in diameter through the inner portion of the nut, being of reduced diameter in the outer portion. The pin comprises a portion 10 of larger diameter to fit into the enlarged part of the aperture 8, a reduced portion 11 to fit the reduced part of the aperture 8, and a head 13 of sufficient size to be readily grasped to operate said pin. This pin is free to rotate and move longitudinally in the nut, its outer end or head projecting beyond the outer face of the nut to a distance sufficient to be grasped and being extended laterally, so as to engage the washer in the manner hereinafter described. A spring 14 is coiled around the reduced portion 11 of the locking-pin within the enlarged aperture of the aperture 8 and bears against a shoulder 15 on the pin and a shoulder 16 in the nut, acting to draw the head of the pin toward the outer face of the nut. When the nut is in the desired position on the bolt, the washer is placed upon the bolt and against the nut and one of the peripheral notches of the washer engages the body of the pin, which, in connection with the action of the flat portions of the bolt and washer, prevents the nut from turning on the bolt and effectually locks the nut. In order, however, to lock the washer and pin in position, the pin is raised and the laterally-extended head of the pin is turned to the proper position to allow the pin to be drawn down by the spring into the groove in the face of the washer corresponding to the notch engaging the body of the pin.

It will thus be seen that the structure is a double locking device, absolutely preventing the nut from rotating about the bolt and also perfectly securing the washer upon the bolt, so that it can in no way be jolted or worked off. The nut may be released by merely grasping the head of the locking-pin and lifting it against the action of the spring, turning the pin and removing the washer.

The modification shown in Fig. 4 varies in the location and nature of the spring used. In this form a washer 15 is employed, concavo-convex in form and of resilient material, and the spring surrounding the locking-pin is omitted. The head of the pin when turned about over the face of the washer presses down the central portion of the resilient washer over which it passes until said head reaches one of the grooves in its face, when it falls into the groove and the washer springs again into its normal place, thus locking the pin in position.

I do not wish to be understood as limiting myself strictly to the precise details of construction hereinbefore described, and shown in the accompanying drawings, as the same may obviously be modified without departing from the principle of my invention.

Having thus fully described my invention, what I claim as new, and desire to secure by Letters Patent, is—

1. In a nut-lock, a bolt non-circular in cross-section, in combination with a nut having an eccentric aperture in its body from front to rear, a locking-pin free to rotate and to move longitudinally in said aperture and provided with a lateral extended head at its outer end, a washer having an aperture conforming to the cross-section of the bolt and provided with peripheral notches to receive the body of the pin, and corresponding grooves in its outer face, and resilient means for holding in engagement the head of the pin and the groove adjacent to the notch engaged by the body of the pin, substantially as described.

2. In a nut-lock, a bolt non-circular in cross-section, in combination with a nut having an eccentric aperture in its body from front to rear, a locking-pin free to rotate and to move longitudinally in said aperture and provided with a laterally-extended head at its outer end, a washer having an aperture conforming to the cross-section of the bolt and provided with peripheral notches to receive the body of the pin, and corresponding grooves in its outer face, and a spring for holding the head of the pin in engagement with one of the grooves of the washer, substantially as described.

In testimony whereof I affix my signature in presence of two witnesses.

JOHN W. SCANLAND.

Witnesses:
C. F. TINDALL,
D. L. YARNELL.